(12) United States Patent
Antoun et al.

(10) Patent No.: US 9,237,547 B1
(45) Date of Patent: Jan. 12, 2016

(54) MANAGEMENT OF CDMA REFERENCE CELL IDENTIFIERS IN AN LTE NETWORK

(71) Applicant: SPRINT COMMUNICATION COMPANY L.P., Overland Park, KS (US)

(72) Inventors: Nicolas A. Nehme Antoun, Olathe, KS (US); Ryan Sanford Talley, Overland Park, KS (US); Shilpa Kowdley Srinivas, Brambleton, VA (US); Khalid M. Medhat, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 333 days.

(21) Appl. No.: 13/965,493

(22) Filed: Aug. 13, 2013

(51) Int. Cl.
*H04W 64/00* (2009.01)

(52) U.S. Cl.
CPC .................................. *H04W 64/003* (2013.01)

(58) Field of Classification Search
None
See application file for complete search history.

(56) References Cited

U.S. PATENT DOCUMENTS

| | | | | |
|---|---|---|---|---|
| 9,088,925 B1* | 7/2015 | Chen | ...................... | H04W 36/24 |
| 2012/0020282 A1* | 1/2012 | Jang | ...................... | H04W 68/12 370/328 |
| 2012/0028661 A1* | 2/2012 | Fang | .................. | H04W 36/0022 455/466 |
| 2012/0034910 A1* | 2/2012 | Fang | ...................... | H04W 28/16 455/422.1 |
| 2012/0064884 A1* | 3/2012 | Ramachandran | ... | H04W 76/027 455/422.1 |
| 2012/0182912 A1* | 7/2012 | Watfa | ................. | H04W 36/0022 370/311 |
| 2013/0150045 A1* | 6/2013 | Das | ........................ | H04W 36/14 455/436 |
| 2014/0003389 A1* | 1/2014 | Wang | ................. | H04W 36/0066 370/331 |
| 2014/0233529 A1* | 8/2014 | Prakash | ............ | H04W 36/0022 370/331 |

* cited by examiner

*Primary Examiner* — Robert C Scheibel
*Assistant Examiner* — Gautam Sharma (57) ABSTRACT

A method, system, and medium are provided for managing CDMA reference cell identifiers (IDs) in a long-term-evolution (LTE) network using Session Initiation Protocol (SIP). A network node subscribes to RF coverage information and location information of eNodeBs and CDMA base stations within the network. After receiving this information from the eNodeBs and the CDMA base stations, the network node uses the information to determine CDMA base stations that are in proximity to each eNodeB. The eNodeBs in the network subscribe to CDMA reference cell IDs of those CDMA base stations that have been determined by the network node to be in proximity to the respective eNodeB. After receiving the CDMA reference cell IDs from the network node, the eNodeB utilizes the received information to select a CDMA base station to utilize when a network customer's UE requires circuit-switched services.

15 Claims, 6 Drawing Sheets

MANAGEMENT OF CDMA REFERENCE CELL IDENTIFIERS IN AN LTE NETWORK

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, computer-readable media, methods, and systems, for managing CDMA reference cell identifiers (IDs) in an LTE network using a signaling communications protocol such as the Session Initiation Protocol (SIP). A network node communicates a request to eNodeBs and CDMA base stations within the network to subscribe to radio-frequency (RF) coverage information and location information associated with each of the eNodeBs and each of the CDMA base stations. Upon receiving the network node request, the eNodeBs and the CDMA base stations communicate their RF coverage information and their location information to the network node. Additionally, each CDMA base station communicates a CDMA reference cell ID associated with the particular CDMA base station. The network node then determines CDMA base stations that are in proximity to each of the eNodeBs. This determination is based on the RF coverage information and the location information received from the eNodeBs and the CDMA base stations. The network node receives a request from each eNodeB to subscribe to CDMA reference cell IDs of those CDMA base stations that have been determined by the network node to be in proximity to the respective eNodeB. The network node communicates to each eNodeB the CDMA reference cell IDs of those CDMA base stations that have been determined by the network node to be in proximity to the respective eNodeB.

BRIEF DESCRIPTION OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BTS Base Transceiver Station
CDMA Code Division Multiple Access
1XCS IWS Circuit-Switched Inter-Working Solution
eCSFB Enhanced Circuit-Switched Fallback
eNodeB Evolved Node B
GIS Geographic Information System
2GPP $2^{nd}$ Generation Partnership Project
3GPP $3^{rd}$ Generation Partnership Project
GPRS General Packet Radio Service
GSM Global System for Mobile Communications
HSS Home Subscriber Server
LTE Long-Term Evolution
MME Mobile Management Entity
MSC Mobile Switching Center
PGW Packet Data Node Gateway
RF Radio-Frequency
SGW Serving Gateway
SIP Session Initiation Protocol
SMS Short Messaging Service
TDMA Time Division Multiple Access
UE User Equipment
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary, $27^{th}$ Edition (2012).

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for managing CDMA reference cell IDs in an LTE network using a signaling communications protocol such as SIP. A network node subscribes to RF coverage information and location information of eNodeBs and CDMA base stations within the network. After receiving this information from the eNodeBs and the CDMA base stations, the network node uses the information to determine CDMA base stations that are in proximity to each eNodeB. The eNodeBs in the network subscribe to CDMA reference cell IDs of those CDMA base stations that have been determined by the network node to be in proximity to the respective eNodeB. After receiving the CDMA reference cell IDs from the network node, each eNodeB utilizes the received information to select a CDMA base station to utilize when a network customer's UE requires circuit-switched services.

Accordingly, in a first aspect, a network node communicates a request to eNodeBs and CDMA base stations within the network to subscribe to radio-frequency (RF) coverage information and location information associated with each of the eNodeBs and each of the CDMA base stations. Upon receiving the network node request, the eNodeBs and the CDMA base stations communicate their RF coverage information and their location information to the network node. Additionally, the CDMA base stations communicate a CDMA reference cell ID associated with the particular CDMA base station. The network node then determines CDMA base stations that are in proximity to each of the eNodeBs. This determination is based on the RF coverage information and the location information received from the eNodeBs and the CDMA base stations. The network node receives a request from each eNodeB to subscribe to CDMA reference cell IDs of those CDMA base stations that have been determined by the network node to be in proximity to the respective eNodeB. The network node communicates to each eNodeB the CDMA reference cell IDs of those CDMA base stations that have been determined by the network node to be in proximity to the respective eNodeB.

In a second aspect, an eNodeB receives a request from a network node to subscribe to RF coverage information and location information associated with the eNodeB. The eNodeB communicates the RF coverage information and the location information to the network node. As well, the eNodeB communicates a request to the network node to subscribe to CDMA reference cell IDs of CDMA base stations that are determined by the network node to be in proximity to the eNodeB. The eNodeB then receives from the network node the CDMA reference cell IDs of the CDMA base stations that have been determined by the network node to be in proximity to the eNodeB.

In a third aspect, a network node communicates a SIP request to each eNodeB and each CDMA base station within the network to subscribe to RF coverage information and location information associated with each of the eNodeBs and each of the CDMA base stations. The network node receives a SIP response from each of the eNodeBs comprising the RF coverage information and the location information. As well, the network node receives a SIP response from each of the CDMA base stations comprising the RF coverage information, the location information, and a CDMA reference cell ID associated with each of the CDMA base stations. The network node determines for each of the eNodeBs one or more CDMA base stations in proximity to the eNodeB using the RF coverage information and the location information received from the eNodeBs and the CDMA base stations. The network node receives a SIP request from each of the eNodeBs to subscribe to CDMA reference cell IDs of CDMA base stations determined by the network node to be in proximity to each of the respective eNodeBs. The network node communicates a SIP response to each of the eNodeBs comprising the CDMA reference cell IDs of the CDMA base stations determined by the network node to be in proximity to the respective eNodeB.

As way of background, currently in most wireless-telecommunications-networks voice traffic is handled by legacy technologies that support circuit-switching, such as CDMA, GSM, and WCDMA while data traffic is handled by packet-switched technologies such as LTE, if available, and by 2GPP and 3GPP technologies in non-LTE areas. Single radio devices (i.e., single radio UEs) use one radio to handle both data and voice traffic. For these types of devices, enhanced circuit-switched fallback (eCSFB) is one of the solutions used by the network to provide voice services and SMS services to users of LTE when voice and SMS services are not implemented on LTE. eCSFB utilizes an inter-working solution (IWS) to switch a UE from LTE technology to a circuit-switched technology such as CDMA so that circuit-switched voice calls can be served to or by the UE. eCSFB is based on the premise that UEs remain associated with the LTE technology until the UEs require circuit-switched services. Once the circuit-switched services are concluded, the UE is switched back to the LTE technology.

While associated with the LTE technology, a UE may utilize LTE channels associated with one or more eNodeBs for data-based services. In order for a particular eNodeB that is currently carrying the UE to effectuate the transfer of the UE to a circuit-switched technology, the eNodeB must be aware of suitable CDMA base stations or channels in proximity to the eNodeB that are available to carry the UE. Currently, eNodeBs in the network are manually populated with reference cell IDs of CDMA base stations that are in proximity to the eNodeBs. Besides the usual problem of errors that occurs with manual entry of information, this methods also fails to account for additions of CDMA base stations or eNodeBs to the network, changes in location of existing CDMA base stations or eNodeBs (e.g., mobile CDMA base stations and mobile eNodeBs), and/or changes in RF coverage data associated with the eNodeBs and CDMA base stations.

Figure 1:
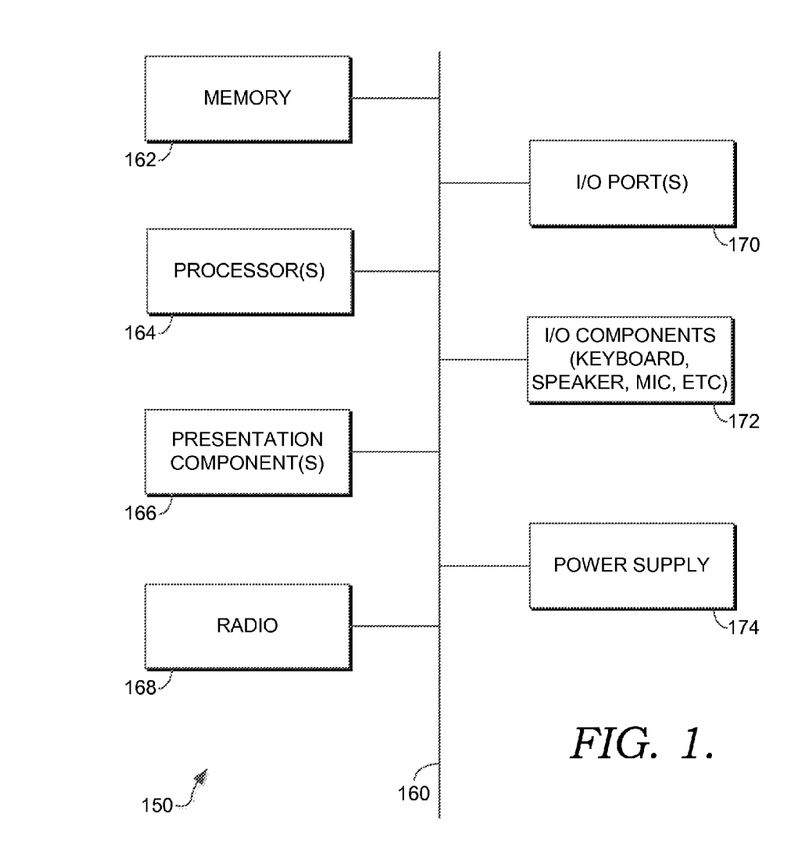
FIG. 1 depicts an exemplary mobile device according to an embodiment of the technology.

Turning now to FIG. 1, a block diagram of an illustrative communications device or UE is provided and is referenced generally by the numeral 150. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

The input/output port 170 might take on a variety of forms. Illustrative input/output ports include a USB jack, stereo jack, infrared port, proprietary communications ports, and the like. The input/output components 172 include items such as keyboards, microphones, speakers, touch screens, and any other item usable to directly or indirectly input data into the communications device 150. Power supply 174 includes items such as batteries, fuel cells, or any other component that can act as a power source to power the communications device 150.

Figure 2:
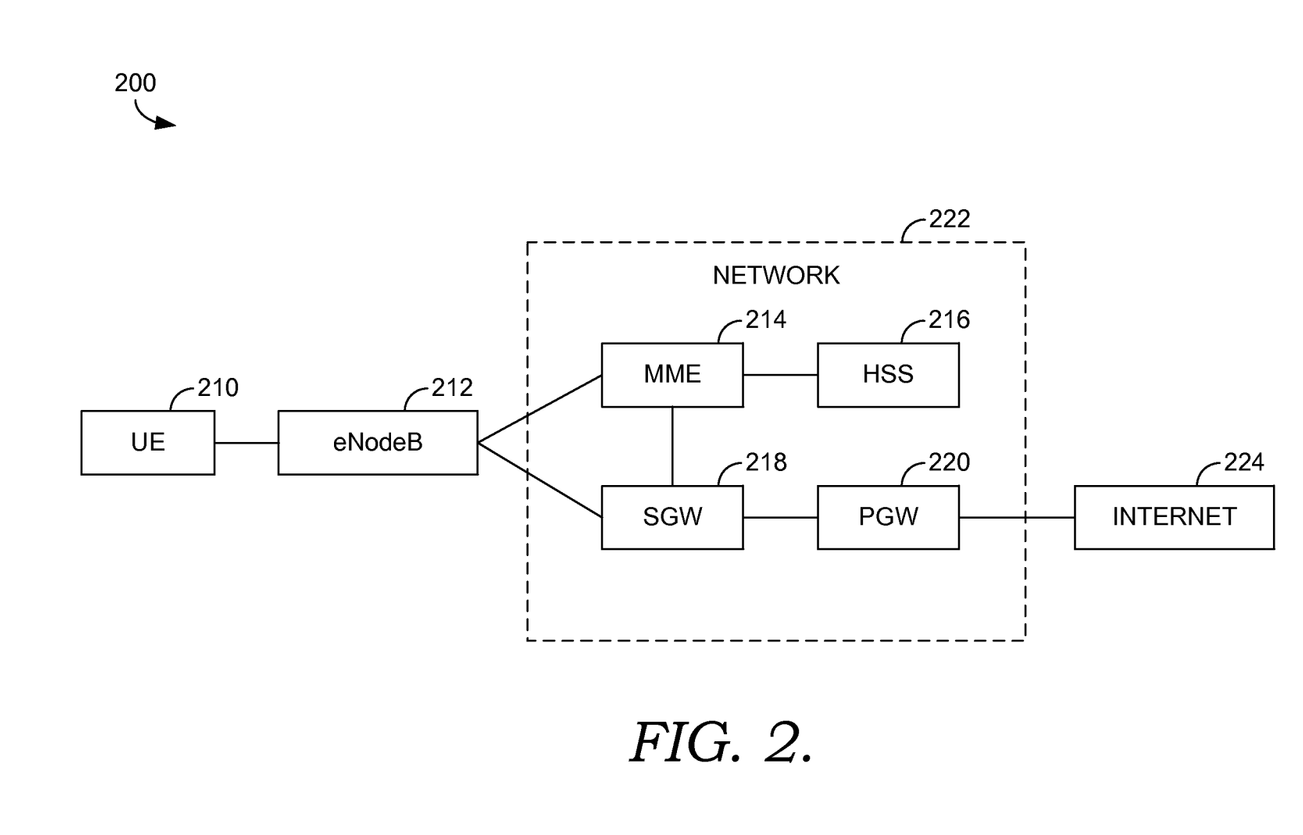
FIG. 2 depicts an exemplary LTE-communications-network-environment suitable for practicing an embodiment of the technology.

FIG. 2 depicts an illustrative LTE wireless-telecommunications-network (the "network") that is referenced generally by the numeral 200. The illustrative network 200 shown in FIG. 2 is merely an example of one suitable LTE networking environment and is not intended to suggest any limitation as to the scope of use or functionality of embodiments of the present invention. Neither should the network 200 be interpreted as having any dependency or requirement related to any single module/component or combination of modules/components illustrated therein. The network 200 depicted in FIG. 2 is simplified for ease of discussion and may include more or less components than those shown in FIG. 2.

The network 200 includes a UE 210, an eNodeB 212, an MME 214, a HSS 216, a SGW 218, a PGW 220, and the Internet 224. The MME 214, HSS 216, SGW 218, and PGW 220 may be considered part of the core network 222. The UE 210 may be the same as the communications device 150 of FIG. 1. The UE 210 may support multiple technologies such as CDMA, EvDO, TDMA, LTE, and the like. In one aspect, the UE 210 may comprise a single radio device that can carry only one technology at a time (e.g., either LTE or CDMA). A single radio UE stands in contrast to a dual-radio device that has two always-on radios—one for packet-switched LTE data and one for circuit-switched voice.

The UE 210 may subscribe to voice and data services offered by the core network 222. As such, the UE 210 may be in communication with the core network 222 via the eNodeB 212. Communication between the UE 210 and the eNodeB 212, and between the eNodeB 212 and the core network 222, occurs through one or more wired- or wireless-telecommunications links. The UE 210 may communicate with the eNodeB 212 via a telecommunications link to facilitate attachment of the UE 210 to the eNodeB 212. Once attached, the UE 210 may also use the telecommunications link to send and/or receive information.

The eNodeB 212 includes hardware and bandwidth(s) of a specified frequency. The hardware includes, for example, the actual radio mast or tower, as well as antennas, transceivers, GPS receivers, electrical power sources, digital signal processors, control electronics, and the like that are associated with the radio tower. The RF spectrum bandwidth may comprise one or more RF channels. Each channel is capable of supporting different types of technology although only one type of technology is supported by a particular RF channel at a time. With respect to this application, the term "channel" refers to an upload spectrum and a download spectrum. The eNodeB 212 carries LTE on one or more of its channels, but it may also carry other technologies on its other channels such as CDMA. Any and all such aspects, and any combination thereof, are contemplated as being within the scope of the invention.

Besides being in communication with the UE 210, the eNodeB 212 is also in communication with other network nodes such as the MME 214 and the SGW 218. The MME 214 is a control node in the LTE network 200. It is responsible for, among other things, UE tracking and paging procedures, authenticating the UE 210, and acting as the control point for the transfer of the UE 210 between LTE channels and, for example, CDMA channels. The HSS 216 is a central data store that contains user-related and subscription-related information. The HSS 216 is utilized for user authentication and access authorization. The SGW 218 routes and forwards data packets, while the PGW 220 provides connectivity from the UE 210 to external data packet networks (i.e., the Internet 224) by being the point of exit and entry of data traffic for the UE 210. As mentioned, the network 200 may include additional components other than those shown. Further, the components shown in FIG. 2 may carry out additional functions besides those described. The discussion of the network 200 is meant to illustrative only and is provided as an aid in understanding embodiments of the invention.

Figure 3:
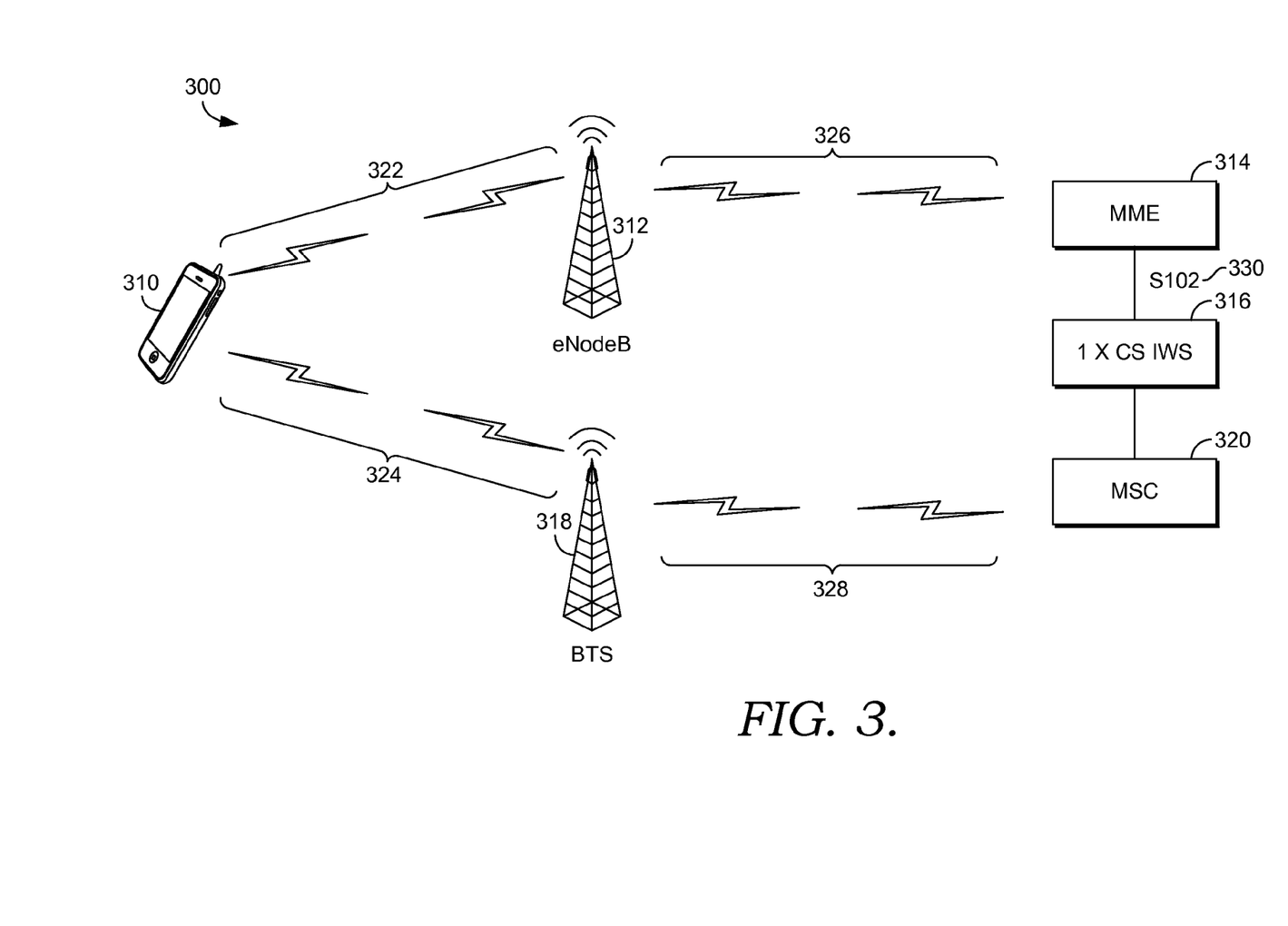
FIG. 3 depicts an illustrative relationship between a user equipment, an eNodeB, a base transceiver station, and one or more network nodes suitable for practicing an embodiment of the technology.

FIG. 3 depicts an illustrative network relationship between a UE 310, an eNodeB 312, a base transceiver station (BTS) 318, and one or more network nodes including an MME 314, a 1XCS IWS 316, and a MSC 320. The illustrative network relationship is referenced generally by the numeral 300. The illustrative relationship 300 shown in FIG. 3 is merely an example of one suitable network relationship and is not intended to suggest any limitation as to the scope of use or functionality of embodiments of the present invention. Neither should the network relationship 300 be interpreted as having any dependency or requirement related to any single module/component or combination of modules/components illustrated therein. The network relationship 300 depicted in FIG. 3 is simplified for ease of discussion and may include more or less components than those shown in FIG. 3.

The UE 310 may be the same as the UE 210 of FIG. 2 and/or the communications device 150 of FIG. 1. Likewise, the eNodeB 312 may be the same as the eNodeB 212 of FIG. 2. The BTS 318 carries one or more circuit-switched technologies such as CDMA. As used throughout this specification, the BTS 318 may otherwise be known as a CDMA base station. The BTS 318 includes hardware and bandwidth(s) of a specified frequency. The RF spectrum bandwidth may comprise one or more RF channels. Each channel is capable of supporting different types of technology although only one type of technology is supported by a particular RF channel at a time. The channels associated with the BTS 318 carry circuit-switched technologies such as CDMA. In one aspect, the eNodeB 312 and the BTS 318 may comprise the same base station—a base station configured to carry both LTE technology and circuit-switched technologies. The UE 310 communicates with the eNodeB 312 and the BTS 318 through wireless-telecommunications links 322 and 324 respectively.

As discussed above with respect to FIG. 2, the eNodeB 312 communicates with the MME 314 through a wired- or wireless-telecommunications link 326 (the MME 314 may be the same as the MME 214 of FIG. 2). The MME 314 serves the UE 310 during LTE access. In one instance, the eNodeB 312 communicates CDMA reference cell IDs to the MME 314 via the telecommunications link 326. The MSC serves the UE 310 voice or SMS services either directly by the BTS 318 via telecommunications link 328 when the UE 310 is not on the LTE network, or by the eNodeB 312 via the 1XCS IWS 316 (hereinafter known as the "IWS 316") when the UE 310 is on the LTE network. As shown, the MME 314 is indirectly connected to the MSC 320 through the IWS 316. The IWS 316 thus acts as a bridge between the LTE-specific MME 314 and the circuit-switched-specific MSC 320. The MME 314 selects the IWS 316 node based on the reference cell ID information provided by the eNodeB 312. The S102 interface 330 between the MME 314 and the IWS 316 enables the UE 310 to utilize both packet-switched services (e.g., data services) and circuit-switched services (e.g., voice and SMS services) while on the LTE network.

Figure 4:
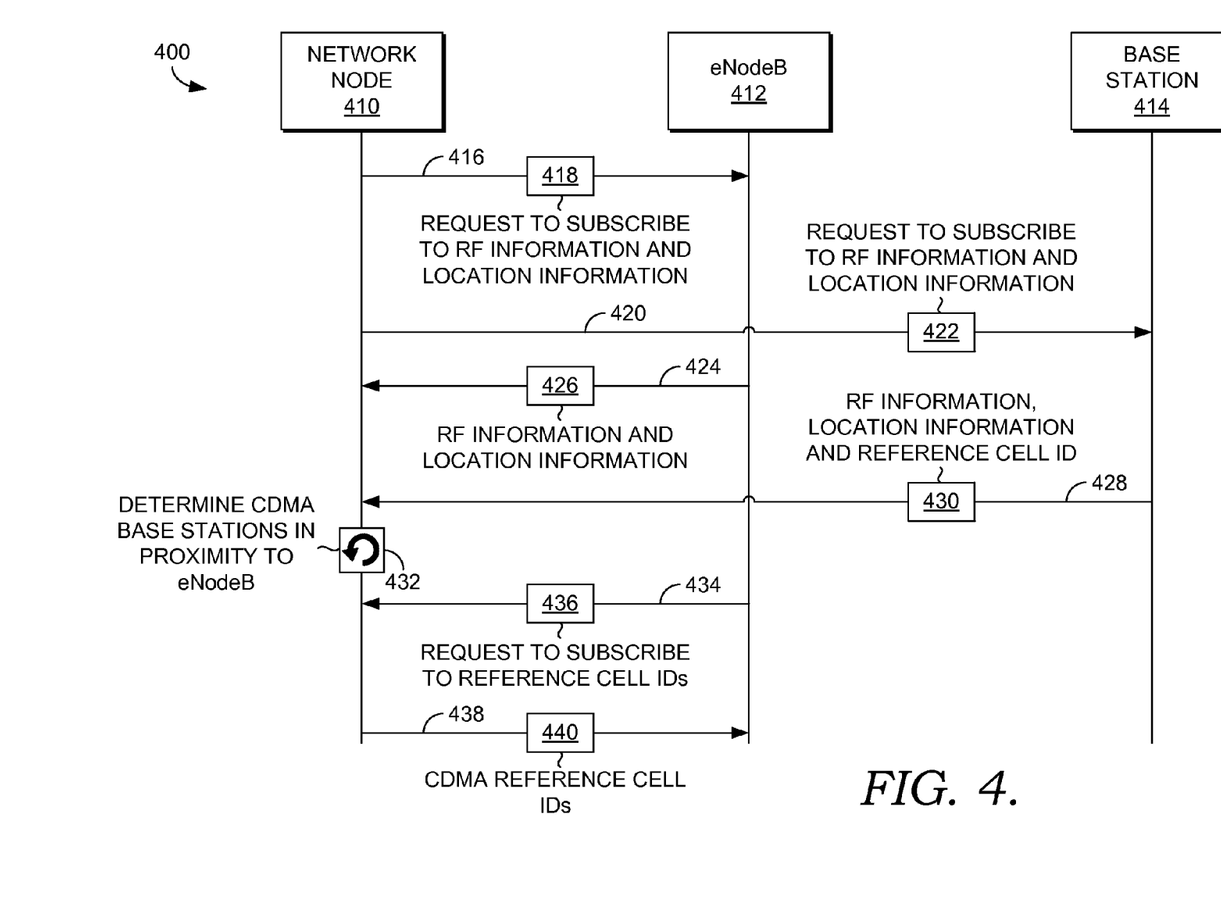
FIG. 4 depicts a process-flow diagram illustrating an exemplary method of managing CDMA reference cell IDs in an LTE network according to an embodiment of the technology.

Turning now to FIG. 4, a process-flow diagram, referenced generally by the numeral 400, is depicted illustrating an exemplary method 400 of managing CDMA reference cell IDs in an LTE network. FIG. 4 includes a network node 410, an eNodeB 412, and a CDMA base station 414. The eNodeB 412 and the CDMA base station 414 may correspond to the eNodeB 312 and the BTS 318 of FIG. 3 respectively. Although only one eNodeB and one CDMA base station are shown in FIG. 4, it is contemplated that there are multiple eNodeBs and multiple CDMA base stations. The network node 410 comprises a new network node (e.g., a network node that is not currently part of the LTE system architecture). The network node 410 may be thought of as a CDMA/LTE presence awareness node.

At a step 416, the network node 410 communicates to the eNodeB 412 a request 418 to subscribe to RF coverage information and location information associated with the eNodeB 412. The subscribe request 418 may be made using a signaling communications protocol such as SIP (RFC 3265 Session Initiation Protocol (SIP)-Specific Event Notification). SIP has elements similar to the HTTP request/response transaction model. For example, each entity in the SIP network is identified by a uniform resource identifier (URI). The SIP subscribe request originates from a first entity and includes an event type and a request-URI, indicating where the request should be sent. The event type describes the type of information being subscribed to by the first entity. A SIP notify response is returned by those entities that received the SIP request and includes the information corresponding to the event type as well as information identifying the entity in the "From" header of the response. Thus, with respect to the subscribe request 418, the event type comprises "loc-RF-Cov," which corresponds to "Location and RF Coverage" information.

At a step 420, the network node 410 communicates to the base station 414 a request 422 to subscribe to RF coverage information and location information associated with the base station 414. Again, the subscribe request 422 comprises a SIP subscribe request with an event type "loc-RFCov."

At a step 424, the eNodeB 412 communicates a response 426 to the network node 410; the response 426 includes the location information and the RF coverage information associated with the eNodeB 412. The response 426 may comprise a SIP notify response as outlined above. The location information may comprise GPS coordinates associated with the eNodeB 412. Other types of location information known in the art may also be utilized. The RF coverage information associated with the eNodeB 412 may comprise the RF propagation model used by the eNodeB 412, the RF coverage radius of the eNodeB 412, and the like.

At a step 428, the base station 414 communicates a response 430 to the network node 410. The response 430 may comprise a SIP notify response and include RF coverage information and location information associated with the base station 414. Like above, the RF coverage information may comprise the RF propagation model used by the base station 414, the RF coverage radius associated with the base station 414, and the like. The location information may comprise GPS coordinates associated with the base station 414 as well as other types of localization information known in the art. The header of the response 430 also includes the reference cell ID associated with the base station 414.

The responses 426 and 430 will be communicated to the network node 410 each time the location information and/or the RF coverage information associated with the eNodeB 412 and/or the base station 414 changes. There are several instances where this may occur. For example, the eNodeB 412 and/or the base station 414 may be mobile. Thus, every time the eNodeB 412 and/or the base station 414 changes location, the eNodeB 412 and/or the base station 414 communicates updated location information to the network node 410. In another example, in response to RF interference from a neighboring base station, the eNodeB 412 and/or the base station 414 may alter its RF propagation model to minimize the interference. The updated RF coverage information is then communicated to the network node 410. Any and all such aspects, and any variation thereof, are contemplated as being within the scope of the invention.

At a step 432, the network node 410 processes the RF coverage information and location information received from the eNodeB 412 and the base station 414 to determine if the CDMA base station 414 is in proximity to the eNodeB 412. As explained above, although only one eNodeB 412 and one base station 414 are shown in FIG. 4, it is contemplated that the network node 410 receives multiple sets of location and RF coverage information from the base stations and the eNodeBs in the network. The network node 410 processes all of this information to determine CDMA base stations that are in proximity to each of the eNodeBs. A CDMA base station is determined to be in proximity to a particular eNodeB when the RF coverage radius of the CDMA base station overlaps with the RF coverage radius of the particular eNodeB, and the GPS coordinates of the CDMA base station and the eNodeB indicate that they are in geographic proximity to each other. After determining CDMA base stations that are in proximity to each of the eNodeBs, the network node 410 stores this information in a data store. The network node 410 may make a new determination each time updated RF coverage information and/or location information is received from the eNodeB 412 and/or the base station 414.

At a step 434, the eNodeB 412 communicates to the network node 410 a request 436 to subscribe to CDMA reference cell IDs of CDMA base stations that have been determined by the network node 410 to be in proximity to the eNodeB 412. The subscribe request 436 may comprise a SIP subscribe request having an event type "CRCI," which corresponds to "CDMA reference cell ID." At a step 438, the network node 410 communicates a response 440 to the eNodeB 412 that includes the CDMA reference cell IDs of those CDMA base stations that have been determined by the network node 410 to be in proximity to the eNodeB 412.

Every time the network node 410 makes a new determination of CDMA base stations in proximity to the eNodeB 412 (e.g., in response to updated RF coverage information and/or location information), the network node 410 communicates the response 440 to the eNodeB 412 with the updated set of CDMA reference cell IDs.

The result of the method outlined in FIG. 4 is that the eNodeB 412 is automatically and without human intervention populated with CDMA reference cell IDs of CDMA base stations that have been determined by the network node 410 to be in proximity to the eNodeB 412. The method 400 is carried out by the network node 410 for each eNodeB in the network. When a UE associated with the eNodeB 412 requires circuit-switched voice or SMS services, the eNodeB 412 will communicate the corresponding fallback CDMA reference cell ID to the UE and to the MME as outlined above, and the MME selects an IWS to use for eCSFB based on the CDMA reference cell ID.

Figure 5:
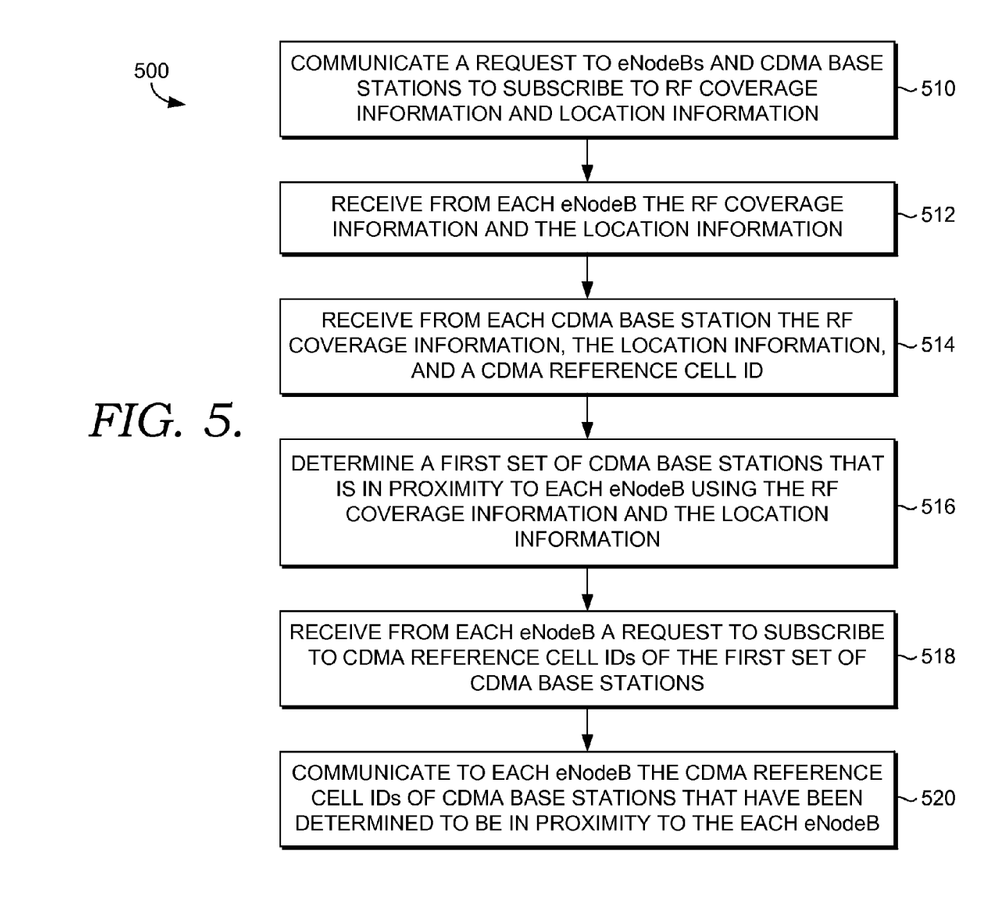
FIG. 5 depicts an illustrative flow diagram of an exemplary method of a network node managing CDMA reference cells IDs in an LTE network according to an embodiment of the technology.

Turning now to FIG. 5, a flow diagram is depicted of an exemplary method 500 of a network node, such as the network node 410 of FIG. 4, managing CDMA reference cells IDs in an LTE network. At a step 510, the network node communicates a request to each eNodeB and each CDMA base station within the network. The request comprises a request to subscribe to RF coverage information and location information associated with each of the eNodeBs and each of the CDMA base stations. The subscribe request may be executed using SIP, and the SIP subscribe request may include an event type of "loc-RFCov," which corresponds to "Location and RF Coverage." The SIP subscribe request remains in effect until it expires according to standard SIP specifications. At the time of expiration, the SIP request may be re-sent from the network node to the eNodeBs and the CDMA base stations.

At a step 512, the network node receives from each of the eNodeBs the RF coverage information and the location information. The information may be received in the form of a SIP notify response. The RF coverage information comprises a RF propagation model utilized by the particular eNodeB and a RF coverage radius associated with the particular eNodeB. The location information comprises GPS coordinates associated with the particular eNodeB. At a step 514, the network node receives from each of the CDMA base stations the RF coverage information and the location information. The information may be received in the form of a SIP notify response. Each response also includes the reference cell ID of the particular base station. Like above, the RF coverage information comprises a RF propagation model utilized by the particular CDMA base station and a RF coverage radius associated with the base station, and the location information comprises GPS coordinates associated with the particular base station. The eNodeBs and the CDMA base stations within the network communicate responses containing RF coverage information and location information to the network node each time the information changes or is updated.

At a step 516, the network node determines CDMA base stations that are in proximity to each of the eNodeBs using the RF coverage information and the location information received from the eNodeBs and the CDMA base stations. A CDMA base station may be determined to be in proximity to a particular eNodeB when the RF coverage radiuses overlap and when the GPS coordinates indicate that they are in geographic proximity to each other. The network node may store this information along with the RF coverage information and the location information in association with a data store.

At a step 518, the network node receives from each of the eNodeBs in the network a request to subscribe to CDMA reference cell IDs of those CDMA base stations that have been determined by the network node to be in proximity to the particular eNodeB. The subscribe request may comprise a SIP subscribe request having the event type "CRCI," which corresponds to "CDMA Reference Cell ID." The SIP subscribe request received from eNodeBs remains in effect until it expires according to standard SIP specifications. At the time of expiration, the SIP request may be re-sent from each of the eNodeBs.

At a step 520, the network node communicates to each of the eNodeBs the CDMA reference cell IDs of those CDMA base stations that have been determined by the network node to be in proximity to the particular eNodeB. The CDMA reference cell IDs are used by the eNodeBs to determine a CDMA base station to utilize when a network customer's UE requires circuit-switched services such as voice and SMS services.

Figure 6:
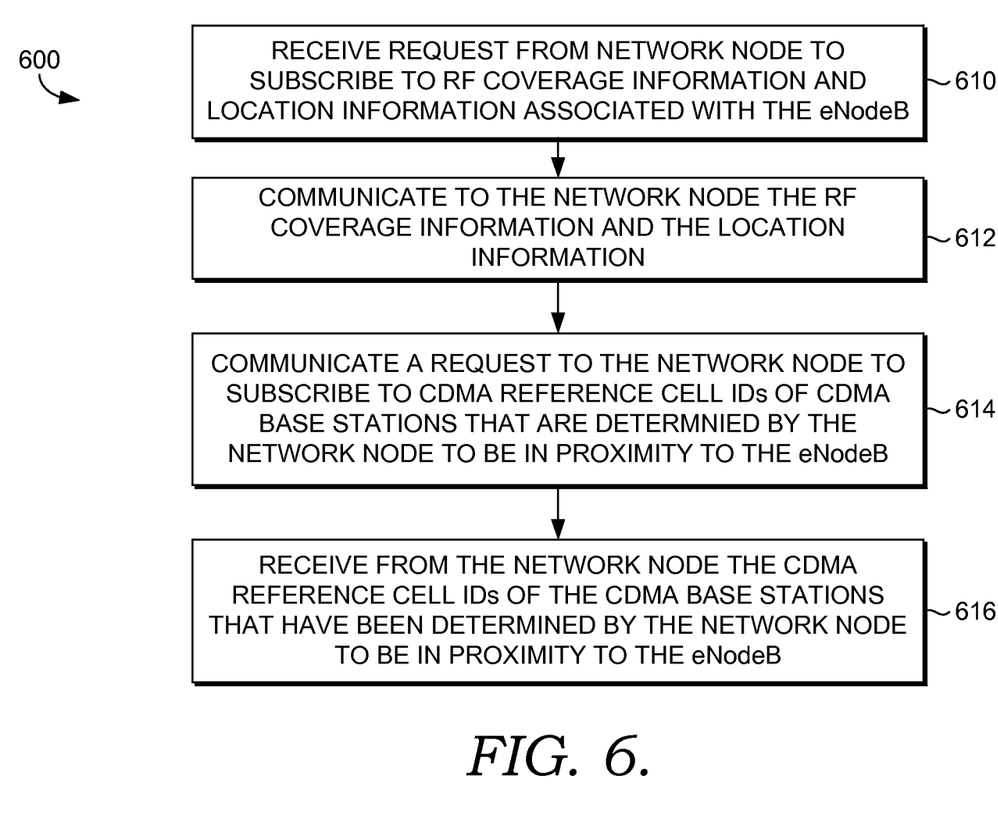
FIG. 6 depicts an illustrative flow diagram of an exemplary method of automatically and without human intervention populating an eNodeB with CDMA reference cell IDs of CDMA base stations that are in proximity to the eNodeB according to an embodiment of the technology.

Turning now to FIG. 6, a flow diagram is depicted of an exemplary method 600 of automatically and without human intervention populating an eNodeB with CDMA reference cell IDs of CDMA base stations that are proximity to the eNodeB. At a step 610, the eNodeB receives a subscribe request from a network node to subscribe to RF coverage information and location information associated with the eNodeB. The subscribe request may be in the form of a SIP subscribe request having an event type of "loc-RFCov."

At a step 612, the eNodeB communicates to the network node the RF coverage information and the location information. This may be in the form of a SIP notify response. The eNodeB communicates this information to the network node each time the location information and/or the RF coverage information changes.

At a step 614, the eNodeB communicates a subscribe request to the network node subscribing to CDMA reference cell IDs of CDMA base stations that have been determined by the network node to be in proximity to the eNodeB. The subscribe request may comprise a SIP subscribe request having an event type "CRCI." The network node may base its determination of CDMA base stations in proximity to the eNodeB on the location information and RF coverage information received from the eNodeB along with location information and RF coverage information received from other eNodeBs and CDMA base stations in the network. The subscribe request communicated at step 514 remains in effect until it expires based on standard SIP specifications. At this time, the eNodeB may communicate a new subscribe request having the event type "CRCI."

At a step 616, the eNodeB receives from the network node CDMA reference cell IDs of those CDMA base stations that have been determined by the network node to be in proximity to the eNodeB. The eNodeB utilizes these reference cell IDs to determine a CDMA base station to fall back to when a UE associated with the eNodeB requires circuit-switched services. The eNodeB may receive updated CDMA reference cell IDs in response to a change in RF coverage information and/or location information of the eNodeB or in response to changes in RF coverage information and/or location information of CDMA base stations in the network.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed by a network node in a long-term-evolution (LTE) network (the "network"), cause the network node to perform a method of using Session Initiation Protocol (SIP) to manage code division multiple access (CDMA) reference cell identifiers (IDs) in the network, the method comprising:

at the network node in the network:
communicating a SIP request to each eNodeB and each CDMA base station in the network to subscribe to radio-frequency (RF) coverage information and location information associated with the each eNodeB and the each CDMA base station;
receiving a SIP response from the each eNodeB in the network comprising the RF coverage information and the location information;
receiving a SIP response from the each CDMA base station in the network comprising the RF coverage information, the location information, and a CDMA reference cell ID associated with the each CDMA base station;
for the each eNodeB, determining a first set of CDMA base stations that is in proximity to the each eNodeB using the RF coverage information and the location information received from the each eNodeB and the each CDMA base station;
receiving from the each eNodeB a SIP request to subscribe to CDMA reference cell IDs of the first set of CDMA base stations that is determined by the network node to be in proximity to the each of the eNodeBs; and
communicating a SIP response to the each eNodeB comprising the CDMA reference cell IDs of the first set of CDMA base stations that is determined by the network node to be in proximity to the each eNodeBs, wherein the CDMA reference cell IDs are utilized by the each eNodeB to determine a CDMA base station within the first set of CDMA base stations to utilize when a network customer's user equipment (UE) associated with the each eNodeB requires voice or SMS services.

2. The media of claim 1, wherein the RF coverage information comprises a coverage radius associated with the each eNodeB and the each CDMA base station and a RF propagation model associated with the each eNodeB and the each CDMA base station.

3. The media of claim 2, wherein the location information comprises GPS coordinates associated with the each eNodeB and the each CDMA base station.

4. The media of claim 3, wherein the first set of CDMA base stations is determined to be in proximity to the each eNodeB when the RF coverage radius of the first set of CDMA base stations overlaps with the RF coverage radius of the each eNodeB, and the GPS coordinates of the first set of CDMA base stations indicate that the CDMA base stations in the first set of CDMA base stations are in geographic proximity to the each eNodeB.

5. The media of claim 1, wherein the UE comprises a single radio UE.

6. The media of claim 1, further comprising:
receiving from at least a portion of the eNodeBs at least one of an updated set of RF coverage information or an updated set of location information;
for each eNodeB of the at least the portion of eNodeBs, determining a second set of CDMA base stations that is in proximity to the each eNodeB using the updated set of RF coverage information, the updated set of location information, the existing CDMA base station RF coverage information, and the existing CDMA base station location information; and
communicating to the each eNode B of the at least the portion of the eNodeBs the CDMA reference cell IDs of the second set of CDMA base stations that is determined by the network node to be in proximity to the each eNodeB of the at least the portion of the eNodeBs.

7. The media of claim 1, further comprising:
receiving from at least a portion of the CDMA base stations at least one of an updated set of RF coverage information or an updated set of location information;
for each of the eNodeBs in the network, determining a second set of CDMA base stations that is in proximity to the each eNodeB using the updated set of RF coverage information, the updated set of location information, the existing eNodeB RF coverage information, and the existing eNodeB location information; and
communicating to the each of the eNodeBs the CDMA reference cell IDs of the second set of CDMA base stations that is determined by the network node to be in proximity to the each of the eNodeBs.

8. One or more non-transitory computer-readable media having computer-executable instructions embodied thereon that, when executed by a computing device associated with an eNodeB in a long-term-evolution (LTE) network (the "network"), cause the computing device to perform a method of automatically and without human intervention populating the eNodeB with code-division-multiple-access (CDMA) reference cell identifiers (IDs) of CDMA base stations that are in proximity to the eNodeB, the method comprising:

at the eNodeB:
receiving a Session Initiation Protocol (SIP) request from a network node in the network to subscribe to radio-frequency (RF) coverage information and location information associated with the eNodeB;
communicating to the network node a SIP response comprising the RF coverage information and the location information;
communicating a SIP request to the network node to subscribe to a set of CDMA reference cell IDs of CDMA base stations that are determined by the network node to be in proximity to the eNodeB; and
receiving a SIP response from the network node comprising the set of CDMA reference cell IDs of the CDMA base stations that have been determined by the network node to be in proximity to the eNodeB, wherein the set of CDMA reference cell IDs are useable by the eNodeB to determine a CDMA base station to utilize when a user equipment (UE) associated with the eNodeB requires circuit-switched services.

9. The media of claim 8, further comprising:
receiving an indication that the UE associated with the eNodeB requires access to circuit-switched services; and
communicating to the network at least one CDMA reference cell ID of the set of CDMA reference cell IDs, wherein the network utilizes the at least one CDMA reference cell ID to provide the UE access to the circuit-switched services.

10. The media of claim 8, further comprising:
receiving an indication that at least one of the RF coverage information or the location information associated with the eNodeB has been modified;
communicating to the network node the at least one of the modified RF coverage information or the modified location information; and receiving from the network node an updated set of CDMA reference cell IDs of CDMA base stations that have been determined by the network node to be in proximity to the eNodeB.

11. One or more non-transitory computer-readable media having computer-executable instructions embodied thereon that, when executed by a network node in a long-term-evolution (LTE) network (the "network"), cause the network node to perform a method of using Session Initiation Protocol (SIP) to manage code division multiple access (CDMA) reference cell identifiers (IDs) in the network:

at the network node in the network:

communicating a SIP request to each eNodeB and each CDMA base station within the network to subscribe to radio-frequency (RF) coverage information and location information associated with the each eNodeB and the each CDMA base station;

receiving a SIP response from the each eNodeB in the network comprising the RF coverage information and the location information;

receiving a SIP response from the each CDMA base station in the network comprising the RF coverage information, the location information, and a CDMA reference cell ID associated with the each CDMA base station;

determining for the each eNodeB in the network one or more CDMA base stations in proximity to the each eNodeB using the RF coverage information and the location information received from the each CDMA base station and the each eNodeB;

receiving a SIP request from the each of the eNodeBs in the network to subscribe to CDMA reference cell IDs of CDMA base stations determined by the network node to be in proximity to the each eNodeB; and communicating a SIP response to the each of the eNodeBs comprising CDMA reference cell IDs of the CDMA base stations determined by the network node to be in proximity to the each eNodeB, wherein the CDMA reference cell IDs are utilized by the each eNodeB to determine a CDMA base station to utilize when a network customer's user equipment (UE) associated with the each eNodeB requires circuit-switched services.

12. The media of claim 11, wherein the SIP request to subscribe to RF coverage information and location information associated with the each eNodeB and the each CDMA base stations includes an event type comprising "loc-RF-Cov".

13. The media of claim 11, wherein the CDMA reference cell ID received from the each CDMA base station is included in a "From" header of the SIP response.

14. The media of claim 11, wherein the SIP request received from the each of the eNodeBs to subscribe to CDMA reference cell IDs of CDMA base stations determined by the network node to be in proximity to the each eNodeB includes an event type comprising "CRCI".

15. The media of claim 11, wherein the RF coverage information comprises a RF propagation model and a RF coverage radius.

* * * * *